United States Patent [19]

Joachim et al.

[11] Patent Number: 5,507,702
[45] Date of Patent: Apr. 16, 1996

[54] LIMITED SLIP DIFFERENTIAL INCORPORATING BEVEL PINIONS

[75] Inventors: Clifford A. Joachim, Baulkham Hills; Stanislaw Spryszynski, Kingswood, both of Australia

[73] Assignee: BTR Engineering (Australia) Limited, New South Wales, Australia

[21] Appl. No.: 146,148

[22] PCT Filed: May 7, 1992

[86] PCT No.: PCT/AU92/00208

§ 371 Date: Dec. 16, 1993

§ 102(e) Date: Dec. 16, 1993

[87] PCT Pub. No.: WO92/19888

PCT Pub. Date: Nov. 12, 1992

[30] Foreign Application Priority Data

May 8, 1991 [AU] Australia .................................. PK6041

[51] Int. Cl.$^6$ .................... F16H 48/28; F16H 48/06
[52] U.S. Cl. ................... 475/233; 475/184; 475/236
[58] Field of Search ........................... 475/183, 184, 475/230, 231, 233, 236

[56] References Cited

U.S. PATENT DOCUMENTS

| | | | |
|---|---|---|---|
| 1,266,712 | 5/1918 | Reagan | 475/233 |
| 1,396,225 | 11/1921 | Logue et al. | 475/233 X |
| 1,431,535 | 10/1922 | MacDonald | 475/233 |
| 2,354,214 | 7/1944 | Lockwood | 475/233 |
| 2,490,146 | 12/1949 | Miller, Jr. | 475/233 |
| 2,850,922 | 9/1958 | Welsh | 475/233 |
| 3,097,545 | 7/1963 | Immel | 475/233 |
| 3,513,723 | 5/1970 | Stees | 74/711 |
| 3,930,424 | 1/1976 | Myers, Sr. | 475/233 X |
| 3,964,346 | 6/1976 | Myers, Sr. | 475/233 |
| 5,055,095 | 10/1991 | Osenbaugh et al. | 475/233 |

FOREIGN PATENT DOCUMENTS 3643732  7/1988  Germany.
606782   of 0000 United Kingdom.

Primary Examiner—Charles A. Marmor
Assistant Examiner—Nathan O. Jensen
Attorney, Agent, or Firm—Marshall, O'Toole, Gerstein, Murray & Borun

[57] ABSTRACT

A torque proportioning differential mechanism (1) for transmitting drive to at least two wheels of a vehicle. The differential includes a carrier (2) adapted to be rotatably driven about a first axis (3) and a plurality of inner peripherally spaced pinion-locating formations (6) defining respective inwardly directed carrier thrust surfaces (7). A pair of spaced apart bevel side gears (4,5) are respectively adapted for connection to the wheels and supported for rotation about a common axis (3) fixed with respect to the carrier. A plurality of peripherally spaced floating shaftless bevel pinions (8) are disposed in meshing engagement with both the side gears (4,5). Each pinion defines a complementary outer pinion thrust surface (9) nestingly disposed closely adjacent a respective one of the locating formations. Under normal driving conditions when both wheels have substantial traction, the pinions are permitted to rotate with minimal frictional resistance in response to relative rotation of the side gears (4,5). Under conditions of wheel slip, however, a separating force component tends to urge the pinions away from the side gears and into engagement with the respective locating formations to create a temporary frictional reaction force between the carrier (2) and the outer pinion thrust surfaces (9). The frictional reaction force resists rotation of the pinions relative to the carrier and thereby provides temporary torque bias between the side gears (4,5).

9 Claims, 5 Drawing Sheets

LIMITED SLIP DIFFERENTIAL INCORPORATING BEVEL PINIONS

TECHNICAL FIELD

The present invention relates to differential mechanisms and in particular to a torque proportioning or "limited slip" differential having inherent frictional torque bias.

The invention has been developed primarily for use in automotive applications, and will be described hereinafter with reference to this application. However, it will be appreciated that the invention is not limited to this particular field of use.

BACKGROUND ART

When a vehicle is cornering, the outside wheel rotates with higher angular velocity than the inside wheel. The conventional differential mechanism accommodates this difference in angular velocity while, in the case of a differential having 100% efficiency, transmitting equal torque to both driving wheels at all times.

However, if one driving wheel loses traction, for example on a slippery surface, this wheel will spin freely and support little or no torque and therefore the conventional differential mechanism will transmit little or no driving torque to the wheel with traction and the vehicle will remain motionless.

One solution to this problem is to provide a torque proportioning or "limited slip" differential whereby torque is biased or transferred to the wheel with the most traction to control loss of drive. The resultant ratio of torques is known as torque bias and is defined in the following equation:

$$\text{Torque bias} = \frac{\text{torque on high torque side}}{\text{torque on low torque side}}$$

Torque proportioning differentials are known. However, many of these known differentials do not provide sufficient range of torque bias for all design applications. These limitations are particularly significant in heavy vehicles. Other known torque proportioning differentials have employed preloading springs and frictional clutches as a means of increasing the torque bias. However, these designs have limited operational life due to excessive clutch wear which occurs whenever there is differential motion as a result of the inherent frictional preload which is applied to the clutches. Furthermore, the inherent friction preload in the clutches resists relative wheel rotation during normal turning manoeuvres thereby adversely affecting vehicle handling under normal driving conditions and giving rise to a further problem of increased tire wear. These problems are particularly significant in front wheel drive vehicular applications.

DISCLOSURE OF THE INVENTION

It is an object of the present invention to provide a relatively simple torque proportioning differential which overcomes or substantially ameliorates at least some of these disadvantages of the prior art.

According to one aspect of the invention there is provided a torque proportioning differential mechanism for transmitting drive to at least two wheels of a vehicle, said differential including a carrier adapted to be rotatably driven about a first axis and having a plurality of inner peripherally spaced pinion locating formations defining respective inwardly directed carrier thrust surfaces, a pair of spaced apart bevel side gears respectively adapted for connection to said wheels and supported for rotation about a common axis fixed with respect to said carrier, a plurality of peripherally spaced floating shaftless bevel pinions each in meshing engagement with both said side gears and having a complementary outer pinion thrust surface nestingly disposed closely adjacent a respective one of said locating formations, said pinions being rotatably supported by said locating formations such that under normal driving conditions when both wheels have substantial traction said pinions are permitted to rotate with minimal frictional resistance in response to relative rotation of the side gears, and such that under conditions of wheel slip a separating force component tends to urge the pinions away from the side gears and into engagement with the respective locating formations to create a temporary frictional reaction force between said carrier and the outer pinion thrust surfaces, said frictional reaction force resisting rotation of the pinions relative to the carrier and thereby providing temporary torque bias between said side gears.

Preferably the pinion locating formations are recessed cavities.

In a preferred embodiment, the differential mechanism includes a centrally spaced block supported by the housing and defining outwardly directed thrust surfaces.

The pinions advantageously define respective inner pinion thrust surfaces nestingly disposed closely adjacent the outwardly directed thrust surfaces of the block such that under said conditions of wheel slip, relative rotation of said pinions with respect to said carrier results in bearing friction between the thrust surfaces of the block and the inner thrust surfaces of the pinions, thereby to provide additional torque bias.

In one embodiment, the inwardly directed carrier or housing thrust surfaces and the complementary outer pinion thrust surfaces are spherical.

In alternative embodiment, the differential mechanism includes a centrally disposed spider having recessed conical sockets to rotatingly receive and locate complementary conical pinion protrusions. In this embodiment, it is preferred that three floating bevel pinions each having mutually opposed outwardly depending conical protrusions defining inner and outer pinion thrust surfaces are uniformly circumferentially spaced around the side gears.

BRIEF DESCRIPTION OF THE DRAWINGS

Preferred embodiments of the invention will now be described, by way of example only, with reference to the accompanying drawings in which.

MODES FOR CARRYING OUT THE INVENTION

Figure 1:
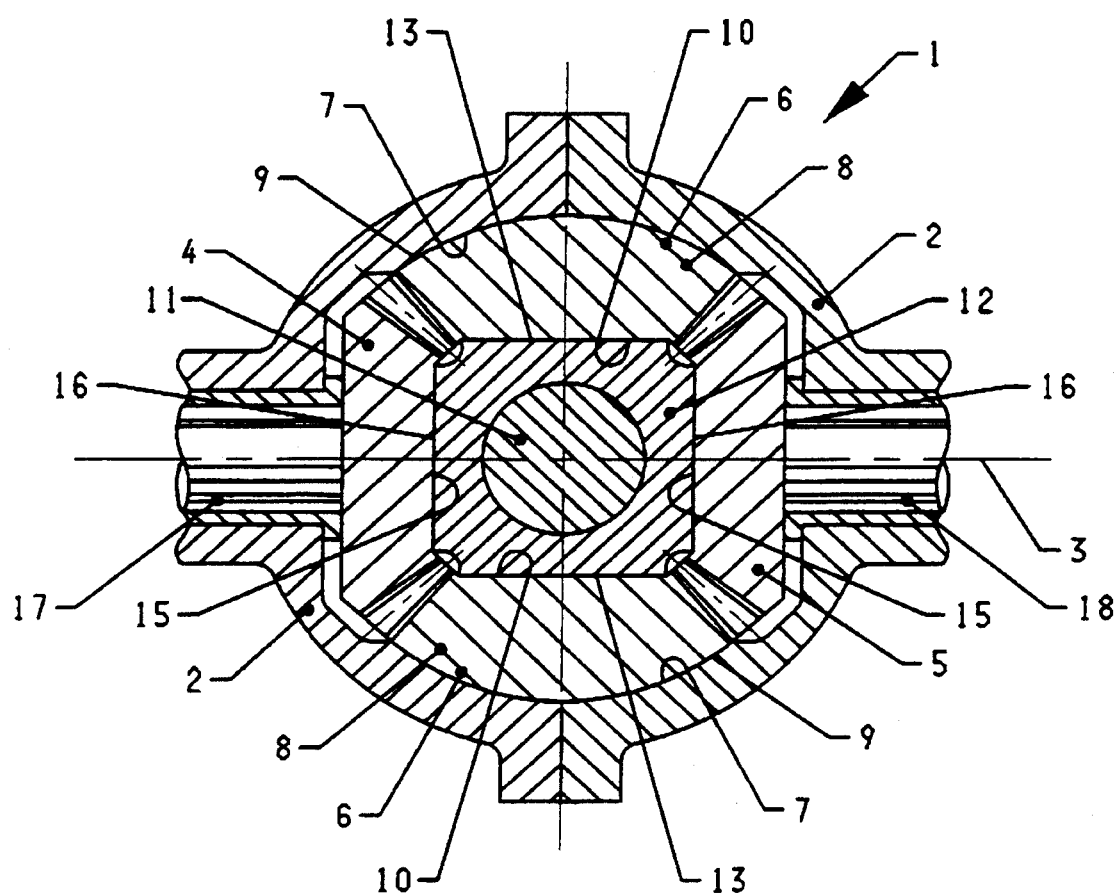
FIG. 1 is a partly sectioned front elevation of a two pinion torque proportioning differential mechanism having a centrally spaced thrust block according to a first embodiment of the invention.

Referring to FIG. 1 of the drawings, a differential mechanism 1 includes a carrier housing 2 adapted to be rotatably driven about a longitudinal axis 3. A pair of independent coaxial parallel side gears 4 and 5 are supported on shafts 17 and 18 for rotation about the axis 3. The carrier housing 2 includes two inner peripherally spaced part-spherical recessed pinion cavities 6 defining respective inwardly directed housing thrust surfaces 7.

Two floating bevel pinions 8, each in meshing engagement with the side gears 4 and 5, have respective pinion outer and inner thrust surfaces 9 and 10. The outer thrust surfaces 9 are adapted for frictional rotation within the recessed cavities 6.

A cubic thrust block 12 is supported centrally within the carrier housing 2 by a cross shaft 11 and defines four outwardly directed thrust surfaces.

The inner thrust surfaces 10 of the two pinions 8 are adapted for frictional rotation relative to two respective thrust block surfaces 13. The thrust block surfaces 16 contact inner surfaces 15 of gears 4 and 5 and thus locate the side gears in position with respect to the housing.

Figure 2:
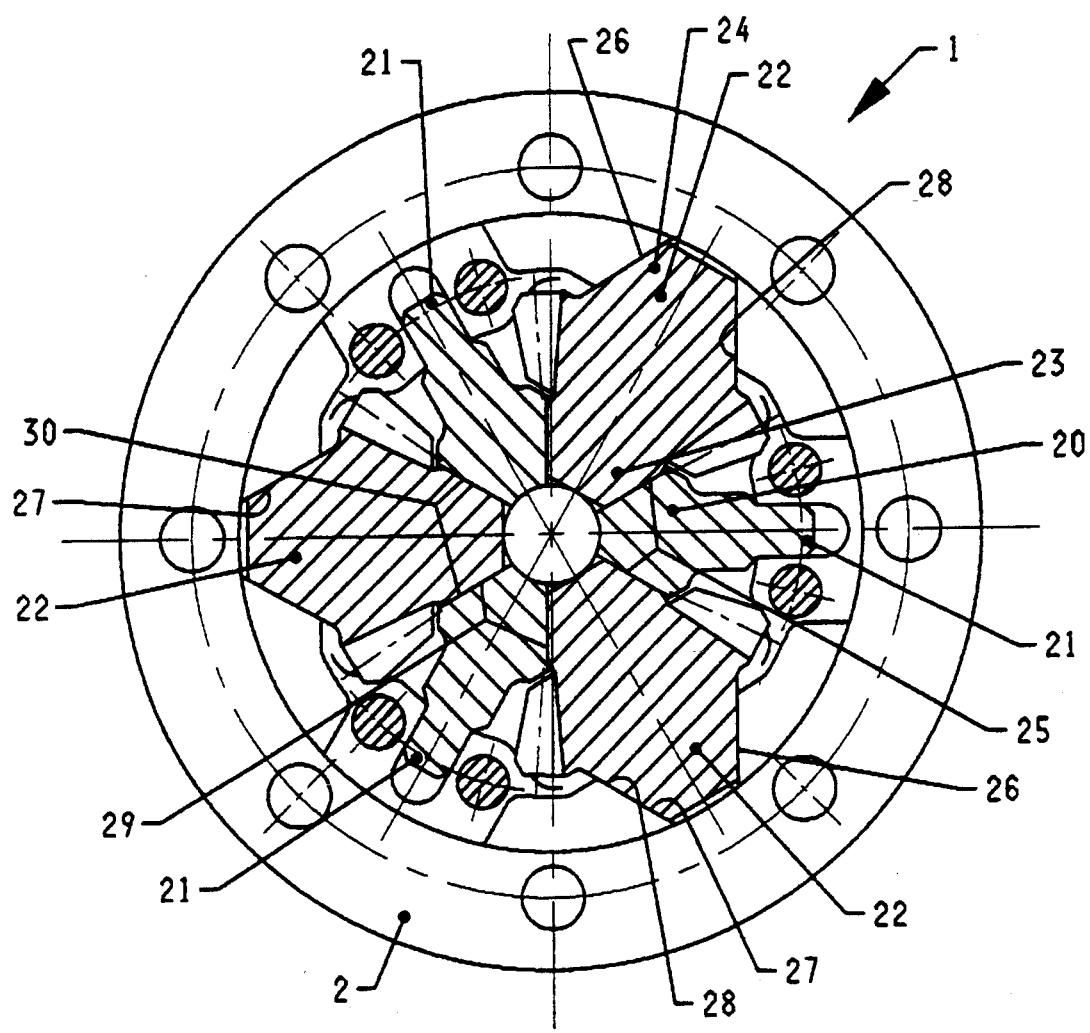
FIG. 2 is a partly sectioned side elevation of a three pinion torque proportioning differential mechanism having a centrally disposed spider rigidly mounted to the housing according to a second embodiment of the invention.
Figure 3:
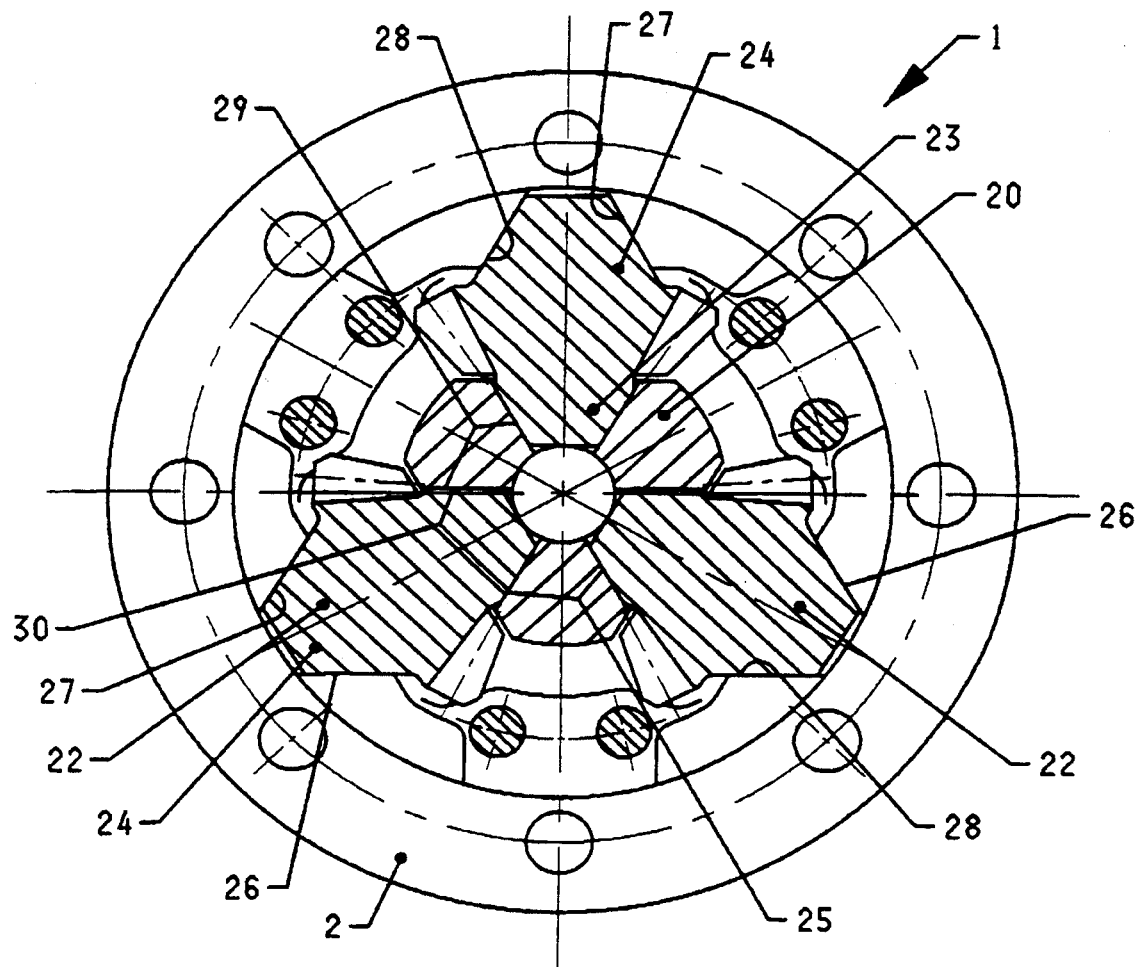
FIG. 3 is a partly sectioned side elevation of a three pinion torque proportioning differential similar to that shown in FIG. 2 but wherein the central spider is free floating, according to a third embodiment of the invention.

Turning now to FIGS. 2 and 3 showing alternative embodiments of the invention wherein corresponding features are denoted by corresponding reference numerals, the differential mechanism 1 includes a centrally spaced spider 20. The spider 20 may be fixed to the carrier housing by radial arms 21 (as shown in FIG. 2) or free floating within the housing as shown in FIG. 3 and located and maintained in position by the thrust forces on the pinions within their respective cavities.

Three floating bevel pinions 22 each have mutually opposed conical protrusions 23 and 24 defining inner 25 and outer 26 pinion thrust surfaces respectively.

The housing 2 includes three uniformly circumferentially spaced conical sockets 27 to receive complementary conical pinion protrusions 24, thereby locating the pinions with respect to the housing. The conical sockets 27 define respective inwardly directed housing thrust surfaces 28 to engage respective complementary pinion outer thrust surfaces 26 with frictional sliding.

Similarly, the spider 20 includes three uniformly spaced radially directed outwardly diverging conical sockets 29 to receive complementary conical pinion protrusions 23. The conical sockets 29 define respective outwardly directed spider thrust surfaces 30 to engage respective complementary pinion inner thrust surfaces 25 with frictional sliding.

Figure 4:
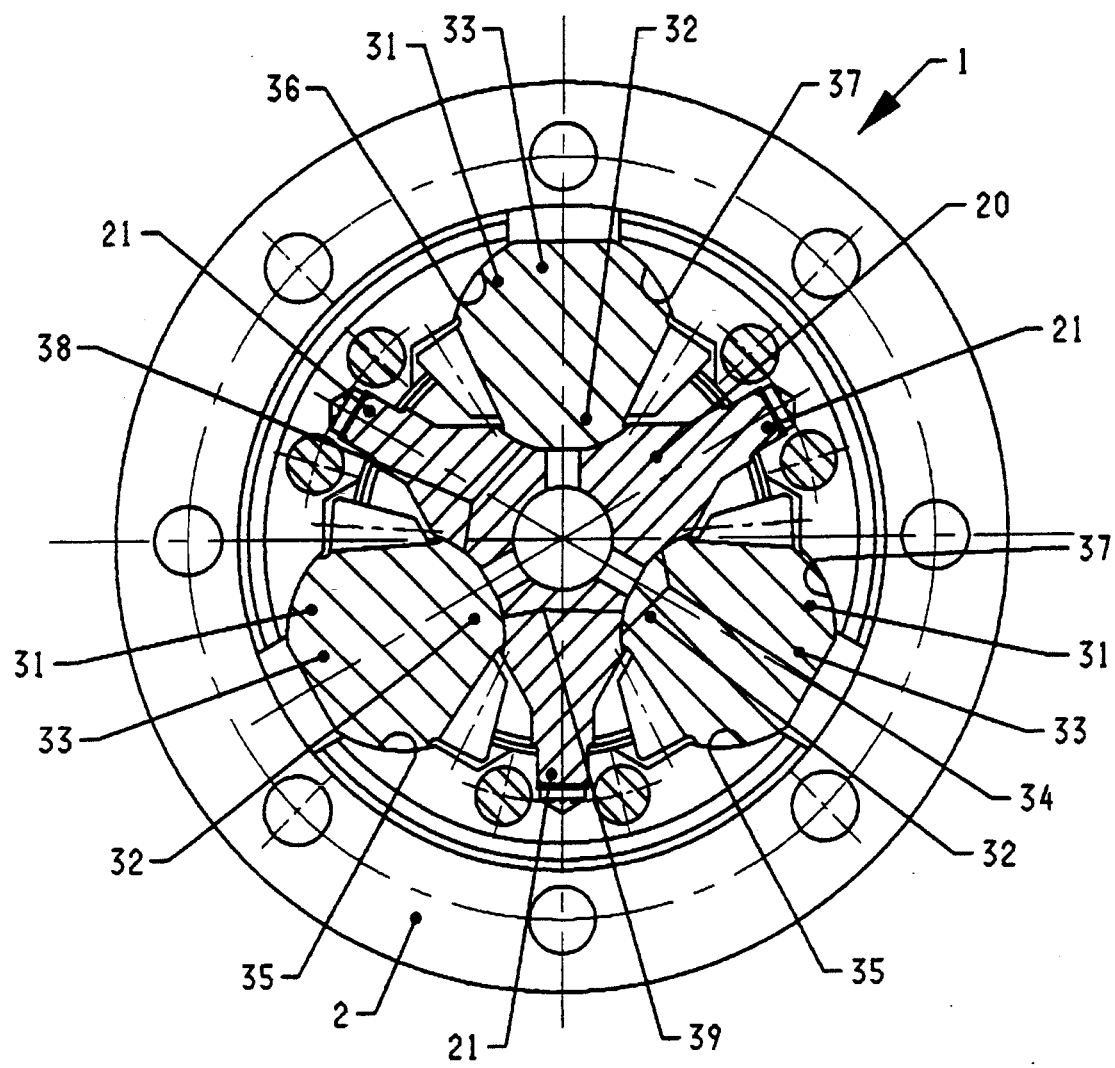
FIG. 4 is a partly sectioned side elevation of a three pinion torque proportioning differential mechanism similar to that shown in FIG. 2 and having spherical thrust surfaces.
Figure 5:
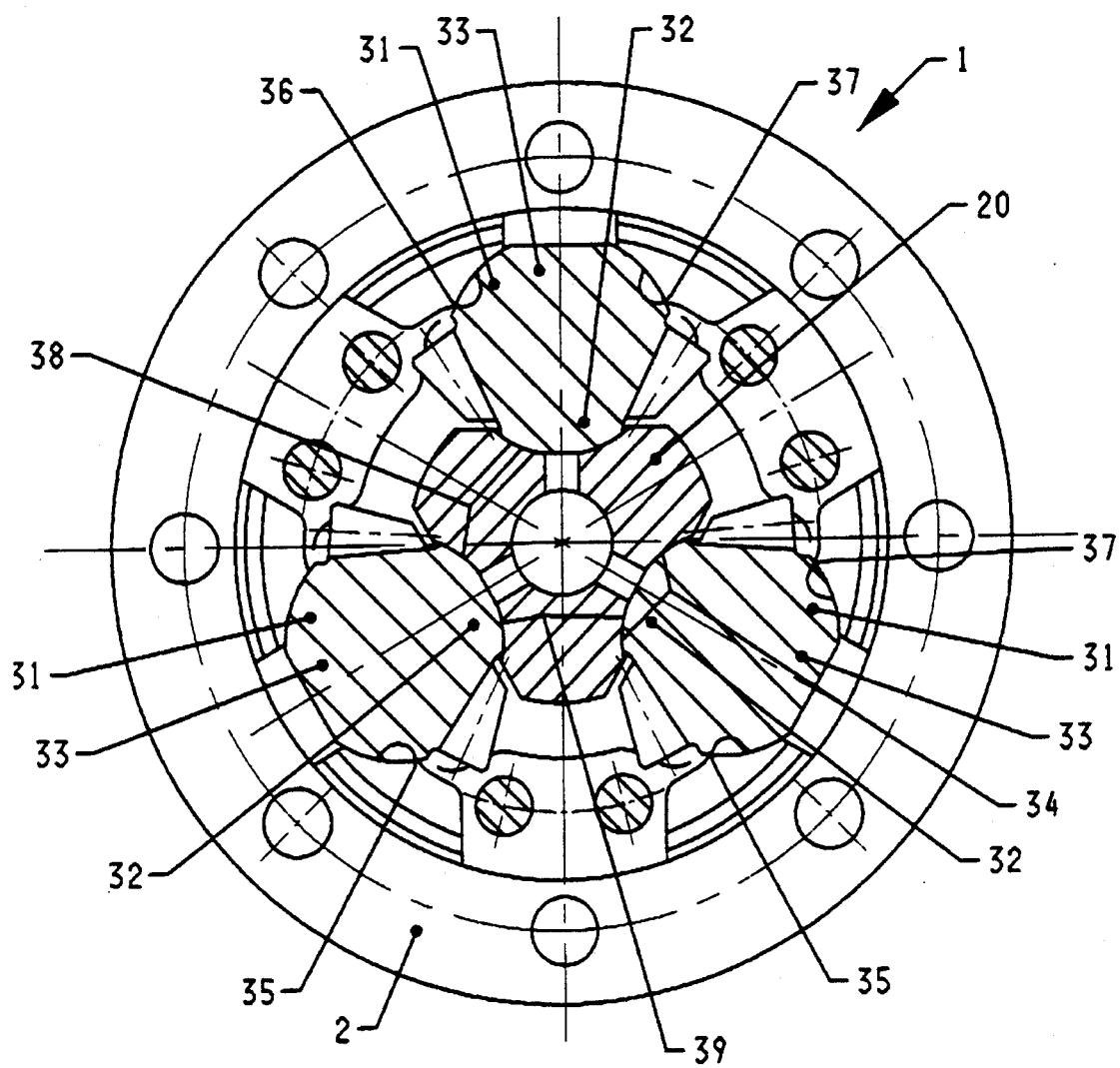
FIG. 5 is a partly sectioned side elevation of a three pinion torque proportioning differential mechanism similar to that shown in FIG. 4, but wherein the central spider is free floating.

Referring to FIGS. 4 and 5, where corresponding features are denoted by corresponding reference numerals, three floating bevel pinions 31 each have mutually opposed spherical protrusions 32 and 33 defining inner 34 and outer 35 pinion thrust surfaces respectively.

The housing 2 includes three uniformly circumferentially spaced spherical sockets 36 to receive complementary spherical pinion protrusions 33, thereby locating the pinions with respect to the housing. The spherical sockets 36 define respective inwardly directed housing thrust surfaces 37 to engage respective complementary pinion outer thrust surfaces 35 with frictional sliding.

Similarly, the spider 20 includes three uniformly spaced radially directed outwardly diverging spherical sockets 38 to receive complementary spherical pinion protrusions 32. The spherical sockets 36 define respective outwardly directed spider thrust surfaces 39 to engage respective complementary pinion inner thrust surfaces 34 with frictional sliding.

These embodiments allow relative motion between the side gears to take place either during a normal turning manoeuvre or under conditions of wheel slip when one wheel loses traction and spins. The pinions are disposed such that relative rotation of the side gears causes a corresponding rotation of the pinions.

During turning manoeuvres torques in opposite directions apply at each side gear, whereas under conditions of wheel slip when one wheel loses traction, unidirectional torques (torques of the same direction) apply at each side gear.

When opposite torques act on the side gears during the execution of a turn, the floating pinions rotate freely without a build up of opposing reaction forces. The forces which produce rotation of the pinions under these conditions are small in magnitude, and the reaction forces at the points of contact are proportionately small giving rise to little or no frictional drag so the pinions rotate freely within their respective cavities.

Under conditions of wheel slip, radially directed forces urge the pinions into frictional engagement with their respective pinion cavities. The resultant bearing friction, arising from the relatively high internal reaction forces, creates an "inefficiency" in the form of high frictional drag which enables unequal unidirectional torques to be supported at the respective side gears.

It will be appreciated that this differential mechanism permits relative motion of the pinions either with low resistance for turning manoeuvres, or with high resistance under conditions of wheel slip. This is a distinct advantage of the present invention over preloaded clutch type torque proportioning differentials of the prior art, which resist relative gear motion under all operating conditions, thereby adversely affecting vehicle handling under normal driving conditions, reducing the service life of the differential and causing unnecessary tire wear. Furthermore, the torque bias actually achieved by these clutch type and other known differentials has sometimes proven inadequate.

It will be apparent that the central spider of the embodiment shown in FIGS. 2 and 3 provides a more positive location for the pinions than the embodiment of FIG. 1, thereby resulting in a mechanism with less differential backlash.

Furthermore, the configuration shown in FIG. 3 having a free floating spider will have a greater degree of differential backlash than the embodiment of FIG. 2, wherein the spider is rigidly supported by the housing.

The configuration of FIG. 3 is a lower cost option that may be used effectively in applications less sensitive to differential backlash.

Turning now to describe the operation of the differential in an automotive application, the carrier housing 2 is driven about the axis 3 by means of an input drive shaft (riot shown). The input drive axis is subsequently diverted through 90° by a bevel pinion meshingly engaging a complementary bevel crown wheel fixed with respect to the carrier. The side gears 4 and 5 are integral with or fixed with respect to a pair of coaxial mutually opposed, outwardly depending half shafts 17 and 18 which in turn are connected to the driving wheels of the vehicle.

Under normal driving conditions both wheels (and hence both side gears) rotate with approximately equal angular velocity and support approximately equal torque. When the vehicle makes a turn, the torques on each side gear apply in opposite directions and under these conditions the pinions rotate freely as in a conventional differential gear mechanism.

However, if one wheel loses traction, unequal torques (in the same direction) apply at each side gear giving rise to high internal reaction forces which are supported by the differential gear train, as radially directed separating force components tend to displace the pinions radially with respect to the pinion cavities. The pinions tend to become wedged into their respective cavities thereby creating frictional drag to provide a locking action which impedes differential rotation of the side gears and enables unequal unidirectional torques to be transmitted to the driving wheels.

It will be appreciated that any number of pinions may be uniformly circumferentially spaced around the side gears 4 and 5 to provide improved dynamic balance and more uniform transmission of gear tooth load, in which case the thrust block or spider would have a complementary configuration. These alternative configurations also provide greater flexibility for designing torque proportioning differentials with a wide range of torque bias ratios for different applications.

Furthermore, it will be appreciated that the thrust surface geometries of the pinions need not be spherical, conical or flat, but could be in the form of any other suitable geometrical shapes such as cylinders, or a series of concentric grooves and ridges to maximise surface contact.

The torque bias of the differential mechanism of the present invention is a function of:

1. The type of bevel gears used (e.g. straight or spiral).
2. The pressure angle of the gears which affects the radial separating force therebetween.
3. The pitch diameter of the pinions.
4. The geometry of the pinion and housing thrust surfaces.
5. The coefficient of friction between the pinions and the housing, which varies with surface finish of the thrust surfaces and with the nature of the lubricant used.
6. The number of pinions used.
7. The configuration of the central thrust block or spider.

The configurations of pinions shown in the drawings achieve a torque bias ratio of the order of 6.0 which is particularly suitable for use with road vehicles.

This invention provides an improved, relatively simple torque proportioning differential mechanism which can provide a wide range of torque bias ratios for a wide range of design applications without the need for springs or clutches. Furthermore, the differential of the present invention does not resist differential rotation of the side gears during normal turning manoeuvres, and so provides increased differential service life, and improved handling and tire wear in vehicular applications.

Although the invention has been described with reference to specific examples, it will be appreciated by those skilled in the art that the invention may be embodied in many other forms.

We claim:

1. A torque proportioning differential mechanism having inherent frictional torque bias, said differential including a carrier adapted to be rotatably driven about a first axis and having a plurality of inner peripherally spaced pinion-locating formations defining respective inwardly directed substantially spherical carrier thrust surfaces, a pair of substantially coaxial spaced apart bevel side gears supported for rotation about a common axis fixed with respect to said carrier, a plurality of peripherally spaced floating shaftless bevel pinions each having substantially straight cut gear teeth in meshing engagement with both said side gears and having a complementary substantially spherical outer thrust surface in nesting engagement with a respective one of said locating formations, said pinions being rotatably supported by said locating formations such that when unequal torques apply at said side gears a separating force tends to urge the pinions outwardly and create reactive frictional force components between the complementary spherical thrust surfaces, thereby resisting rotating of the pinions relative to the carrier and providing torque bias between said side gears.

2. A differential mechanism according to claim 1 wherein said pinion-locating formations comprise respective cavities recessed into said carrier to define said spherical carrier thrust surfaces.

3. A differential mechanism according to claim 1, further including a centrally disposed thrust block defining outwardly directed thrust block surfaces, and wherein said floating bevel pinions define corresponding inner pinion thrust surfaces respectively adapted for frictional rotation with respect to said thrust block surfaces, such that when unequal torques apply at said side gears relative rotation of said pinions with respect to said carrier results in bearing friction between said thrust block surfaces and said inner pinion thrust surfaces to provide enhanced torque bias characteristics.

4. A differential mechanism according to claim 2 wherein said thrust block surfaces and the corresponding inner pinion thrust surfaces are substantially flat.

5. A differential mechanism according to claim 3 wherein said thrust block surfaces are defined by partially spherical recessed cavities, and wherein said inner pinion thrust surfaces are defined by corresponding spherical protrusions.

6. A differential mechanism according to claim 5 wherein the spherical inner and outer thrust surfaces of each pinion are of substantially the same radius and are substantially concentric.

7. A differential mechanism according to claim 3 wherein said thrust block comprises a central spider, which floats freely of said carrier, and is located by said floating pinions.

8. A differential mechanism according to claim 3 wherein said thrust block comprises a central spider, fixedly supported by said carrier such that said carrier and said spider together locate said floating pinions.

9. A differential mechanism according to claim 1, including at least three floating bevel pinions, each having spherical protrusions defining respective substantially spherical inner and outer pinion thrust surfaces, said pinions being uniformly spaced around said side gears.

\* \* \* \* \*